(12) United States Patent
Takeshita et al.

(10) Patent No.: US 7,556,473 B2
(45) Date of Patent: Jul. 7, 2009

(54) CONTROL UNIT FOR COMPRESSOR

(75) Inventors: Kazuko Takeshita, Hiroshima-ken (JP);
Kazuhiro Takeda, Hiroshima-ken (JP);
Susumu Kouno, Hiroshima-ken (JP);
Jun Nakamura, Hiroshima-ken (JP);
Kenichiro Nakamura, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 492 days.

(21) Appl. No.: 10/567,018

(22) PCT Filed: Aug. 27, 2004

(86) PCT No.: PCT/JP2004/012366

§ 371 (c)(1),
(2), (4) Date: Oct. 25, 2006

(87) PCT Pub. No.: WO2005/021976

PCT Pub. Date: Mar. 10, 2005

(65) Prior Publication Data
US 2007/0110587 A1 May 17, 2007

(30) Foreign Application Priority Data
Aug. 28, 2003 (JP) ............................. 2003-304269

(51) Int. Cl.
*F01D 17/00* (2006.01)
(52) U.S. Cl. .............................. 415/17; 415/36; 415/37; 415/58.4; 415/151
(58) Field of Classification Search ................... 415/17, 415/26, 58.4, 149.1, 149.2, 161, 147, 151, 415/36, 37, 39; 60/39.465
See application file for complete search history.

(56) References Cited

U.S. PATENT DOCUMENTS 5,195,875 A * 3/1993 Gaston ........................ 417/282

(Continued)

FOREIGN PATENT DOCUMENTS

JP 49-123607 10/1974

(Continued)

OTHER PUBLICATIONS

Japanese Office Action mailed Feb. 1, 2008 for Japanese Patent Application No. 2003-304269 w/partial translation.

*Primary Examiner*—Ninh H Nguyen
(74) *Attorney, Agent, or Firm*—Wenderoth, Lind & Ponack, L.L.P.

(57) ABSTRACT

The present invention includes an inflow quantity regulating means 5 for regulating the inflow quantity of a fuel gas to a compressor 1; a recycle valve 7 for returning the fuel gas discharged from the compressor 1 to the inlet side of the compressor 1; and a control means which sets a control operating value for operating the compressor 1 at a predetermined operation point, and controls the inflow quantity regulating means 5 and the recycle valve 7 based on the control operating value. The control means has a first control signal generating means 27 which generates a signal increasing with an increase in the operating value as a control signal for the inflow quantity regulating means 5 when the control operating value is a predetermined value or larger and a second control signal generating means 29 which generates a signal decreasing with an increase in the operating value as a control signal for the recycle valve 7 when the control operating value is smaller than the predetermined value. According to the present invention, high controllability can be obtained under all operating conditions including load shutdown.

15 Claims, 7 Drawing Sheets

U.S. PATENT DOCUMENTS 5,798,941 A * 8/1998 McLeister .................. 700/282
6,602,057 B2 * 8/2003 Saxena et al. ............... 417/286
6,907,722 B2 * 6/2005 Tanaka .................... 60/39.281

FOREIGN PATENT DOCUMENTS

| | | |
|---|---|---|
| JP | 54-128808 | 10/1979 |
| JP | 55-142993 | 11/1980 |
| JP | 2-259298 | 10/1990 |
| JP | 6-66159 | 3/1994 |
| JP | 6-146930 | 5/1994 |
| JP | 8-254197 | 10/1996 |
| JP | 3137498 | 12/2000 |

* cited by examiner

CONTROL UNIT FOR COMPRESSOR

TECHNICAL FIELD

The present invention relates to a control unit for a compressor which compresses a fuel gas.

BACKGROUND ART

There has been proposed a fuel gas feeding device for a gas turbine, which is provided with a control means for controlling the feed rate of a fuel gas supplied to the gas turbine to keep the discharge pressure of a fuel gas compressor within a set range.

In this fuel gas feeding device for a gas turbine, a bypass valve is provided between a suction passage and a discharge passage of the compressor, by which the discharge pressure is kept within the set range by controlling the opening of the bypass valve based on a signal from a pressure detector for detecting the discharge pressure. Patent Document 1: Japanese Patent No. 3137498

DISCLOSURE OF THE INVENTION

Problems that the Invention is to Solve

However, in the above-described conventional fuel gas feeding device for a gas turbine, a sudden variation in fuel gas consumption, for example, at the load shutdown time cannot be accommodated properly.

To cope with this problem, conventionally, a technique has also been proposed in which the discharge pressure of a compressor is kept within a set range by controlling the opening of an inlet guide valve (IGV) provided in the compressor, and in which a recycle valve (RCV) connected to the outlet of compressor is opened suddenly, for example, at the load shutdown time, whereby some of the fuel gas discharged from the compressor is returned to the inlet side of the compressor to avoid what is called surging.

However, in this technique, it is not easy to properly set the opening when the recycle valve is suddenly opened, nor is it easy to set change rate of opening decrease after the sudden opening. Therefore, after the operation of the recycle valve, sometimes the control cannot be transferred to discharge pressure control using the inlet guide valve. Also, sometimes the discharge pressure control using the inlet guide valve and the antisurge control using the recycle valve interfere with each other.

The present invention has been made in view of the above circumstances, and accordingly an object thereof is to provide a control unit for a compressor, which provides high controllability under all operating conditions including load shutdown.

Means of Solving the Problems

To achieve the above object, the present invention provides a control unit for a compressor, comprising an inflow quantity regulating means for regulating the inflow quantity of a fuel gas to a compressor; a recycle valve for returning the fuel gas discharged from the compressor to the inlet side of the compressor; and a control means which sets a control operating value for operating the compressor at a predetermined operation point, and controls the inflow quantity regulating means and the recycle valve based on the control operating value, characterized in that the control means has a first control signal generating means which generates a signal increasing with an increase in the operating value as a control signal for the inflow quantity regulating means when the control operating value is a predetermined value or larger and a second control signal generating means which generates a signal decreasing with an increase in the operating value as a control signal for the recycle valve when the control operating value is smaller than the predetermined value.

As the inflow quantity regulating means, an inlet guide valve provided at the inlet of the compressor or a driver for rotating the compressor can be used.

The first control signal generating means can be configured so as to generate a minimum opening signal for making the opening of the inlet guide valve a predetermined minimum opening when the control operating value is smaller than the predetermined value.

The value of the minimum opening signal is preferably changed according to the pressure of fuel gas flowing into the compressor.

As the control operating value, a value obtained by adding an operating value for feedforward control to an operating value for feedback control can be used.

The operating value for feedback control can be formed based on a deviation in pressure of fuel gas discharged from the compressor, and the operating value for feedforward control can be formed based on the magnitude of load of the compressor.

In the case where the fuel gas discharged from the compressor is supplied to load equipment via a header tank, the operating value for feedback control may be set based on a deviation between a discharge flow rate set value corresponding to the deviation in pressure of the fuel gas and the inflow quantity of fuel gas to the header tank.

The discharge flow rate set value corresponding to the deviation in pressure of the fuel gas includes the outflow quantity of the fuel gas from the header tank so that the response of flow rate control can be improved.

The valve control means can be configured so that at the load shutdown time, tracking of the operating value for feedback control to a predetermined value is performed to quickly open the recycle valve.

The valve control means can further include an antisurge signal generating means and a high-level selecting means which compares an antisurge signal with the control signal of the recycle valve, and selectively sends out a higher-level signal of these signals to the recycle valve.

In the case where a plurality of compressors are operated at the same time, a value obtained by adding the operating value for feedforward control to the operating value for feedback control is used as the control operating value for any one compressor, and the operating value for feedforward control is used as the control operating value for other compressors.

According to the present invention, since not only the inlet guide valve but also the recycle valve is utilized for discharge pressure control of the compressor, a good control result can be obtained under all operating conditions (at the load shutdown time, at the trip time of the compressor and the gas turbine, at the time of normal operation, etc.). Moreover, since the inlet guide valve and the recycle valve are operated in the split range, interference in control caused by these valves is avoided.

Also, pressure control with high readiness can be carried out by a combination of feedforward control and feedback control. Further, since higher-level control of discharge pressure control and antisurge control is selectively applied to the recycle valve, interference between these controls is also avoided.

Figure 1:
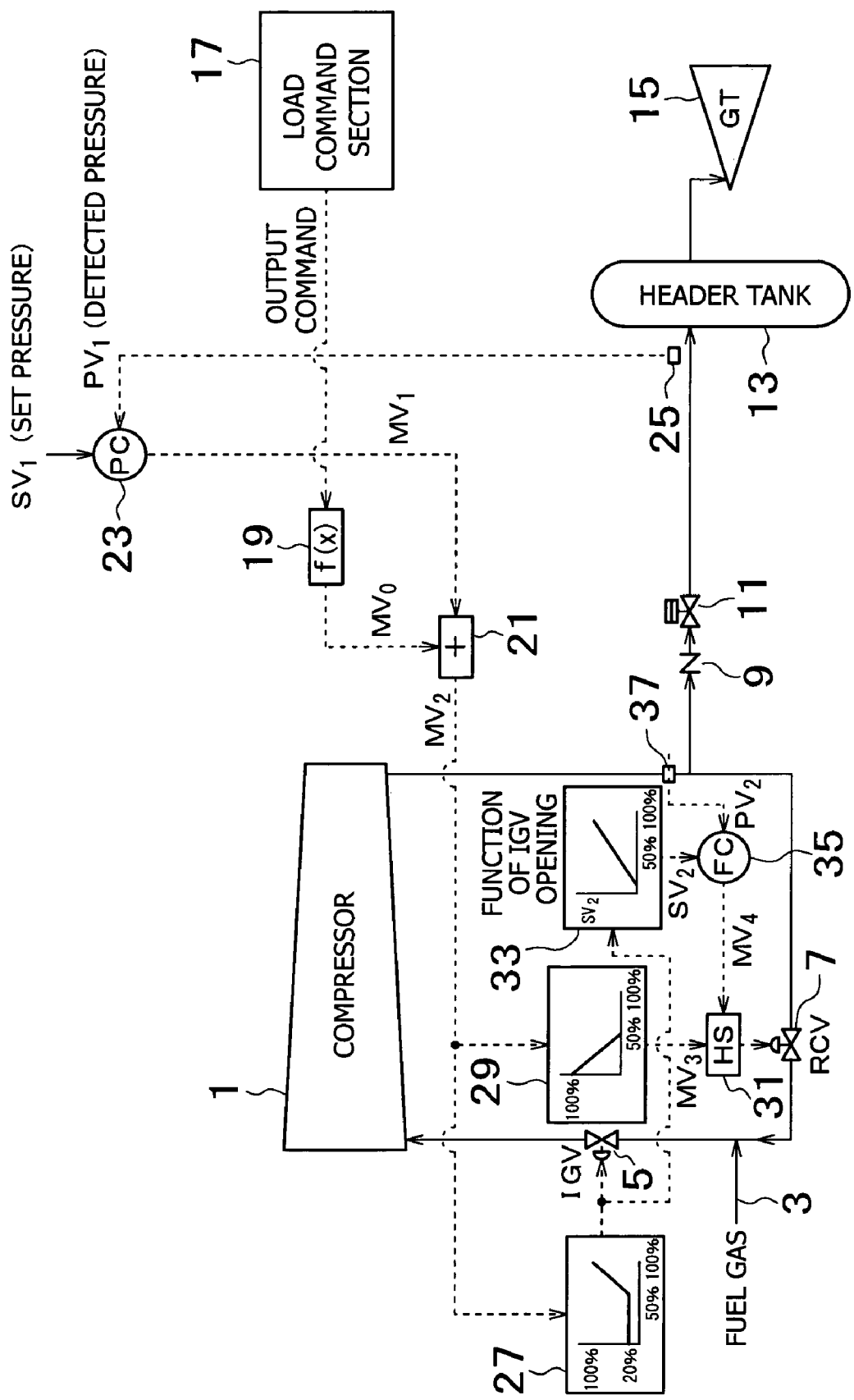
FIG. 1 is a block diagram showing a first embodiment of a control unit for a compressor in accordance with the present invention.

EXPLANATION OF REFERENCE NUMERALS 1, 1A, 1B ... compressor
3 ... fuel gas feed line
5 ... IGV
7 ... RCV
13 ... header tank
15, 15A, 15B ... gas turbine
17, 17' ... load command section
19, 19A, 19B ... function generator
21 ... adder
23, 23' ... pressure controller
25 ... pressure gage
27, 27' ... function generator
29 ... function generator
31 ... high-level selection section
33, 33' ... function generator
35 ... flow controller
37 ... flowmeter
39 ... driver
41 ... rotational speed detector
43 ... flow controller
45 ... adder
47 ... flowmeter
49 ... flowmeter
51A, 51B ... switching element

BEST MODE FOR CARRYING OUT THE INVENTION

Embodiments of a control unit for a compressor in accordance with the present invention will now be described with reference to the accompanying drawings.

Embodiment 1

FIG. 1 shows a first embodiment of the present invention. In FIG. 1, an inlet guide valve (hereinafter referred to as an IGV) 5 is interposed between the inlet of a compressor 1 and a fuel gas feed line 3, and a recycle valve (hereinafter referred to as an RCV) 7 is interposed between the outlet of the compressor 1 and the fuel gas feed line 3. The RCV 7 has a construction having high response as compared with the IGV 5.

The compressor 1 compresses a fuel gas (in this example, a fuel gas of a constant pressure) supplied from the gas feed line 3 via the IGV 5. The fuel gas compressed by the compressor 1 is supplied to a gas turbine 15 via a check valve 9, a regulating valve 11, and a header tank 13, and is burnt in the gas turbine 15.

Figure 2:
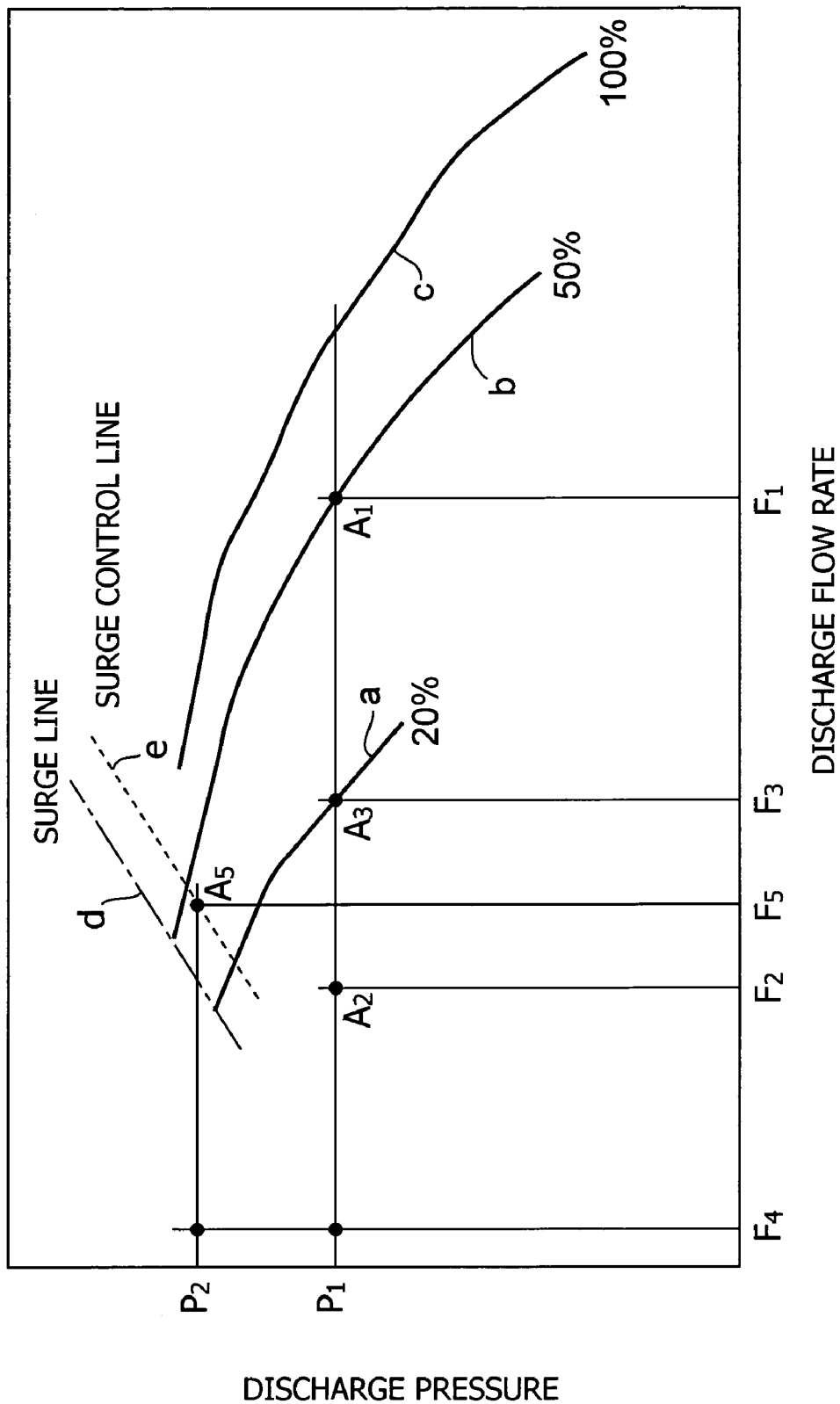
FIG. 2 is a characteristic diagram illustrating the relationship between discharge flow rate and discharge pressure with an IGV opening being a parameter.

Curves a, b and c in FIG. 2 illustrate the relationship between discharge flow rate and discharge pressure of the compressor 1 in the case where the opening of the IGV 5 is 20%, 50% and 100%, respectively. According to this relationship, for example, in the case where a set pressure $SV_1$ is $P_1$ and the flow rate required by the gas turbine 15 side is $F_1$, by setting the opening of the IGV 5 at 50%, the compressor 1 is operated at an operation point $A_1$.

When the load required by the gas turbine 11 decreases, the opening of the IGV 5 is decreased, by which the flow rate of fuel gas has only to be decreased to a rate corresponding to the required load. However, the control accuracy of the IGV 5 at a certain opening or smaller becomes low because of the valve construction. In this embodiment, therefore, as described later, the minimum opening (in this example, an opening of 20%) of the IGV 5 is set, and the IGV 5 is designed so that the opening thereof is not made smaller than this minimum opening.

If the minimum opening is set, there arises a disadvantage that the discharge flow rate is not decreased after the IGV 5 has reached the minimum opening. Therefore, as described later, when the IGV 5 reaches the minimum opening, that opening is held, and also some of the fuel gas discharged from the compressor 1 is returned to the fuel feed line 3 side via the RCV 7.

Specifically, when the required flow rate of fuel gas is, for example, $F_2$ shown in FIG. 2, the discharge flow rate can only be decreased to a discharge flow rate $F_3$ ($>F_2$) based on the opening of 20% depending on the IGV 5. Therefore, the fuel gas of a flow rate corresponding to $F_3-F_2$ is returned, namely, recycled to the fuel feed line 3 side by opening the RCV 7. Thereby, the fuel gas of the required flow rate $F_2$ is supplied to the turbine 15 side. In this case, the operation point of the compressor 1 is $A_3$, not $A_2$.

Figure 3:
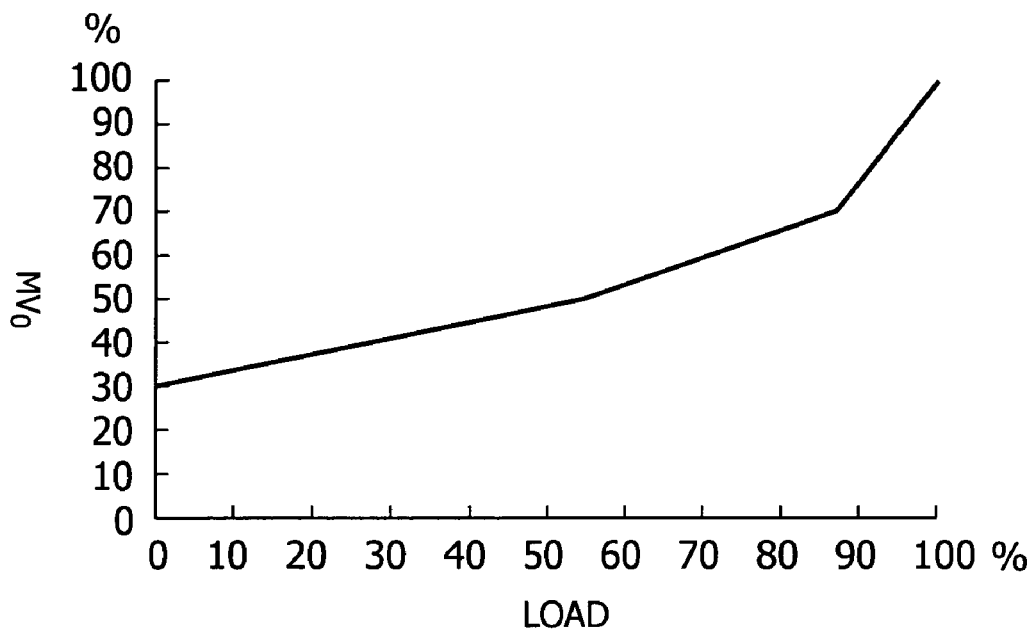
FIG. 3 is a graph illustrating a function of a load command specifying a valve opening operating value.

At the time when the gas turbine 15 is operated, a load command section 17 gives an output command to a function generator 19. This output command is given as a load factor of the case where the maximum load of the gas turbine 15 is 100%. The function generator 19 converts the output command into an operating value $MV_0$ based on a function illustrated in FIG. 3, and sends out a signal corresponding to this operating value $MV_0$. The output signal of the function generator 19 is sent to an adder 21 as an operation signal for feedforward control. The details of the operating value $MV_0$ will be described later.

On the other hand, a pressure controller 23 receives a signal representative of the set pressure $SV_1$ and a signal representative of an actual discharge pressure $PV_1$ detected by a pressure gage 25. The pressure controller 23 calculates an operating value $MV_1$ obtained by subjecting a deviation between the set pressure $SV_1$ and the actual discharge pressure $PV_1$ to PI (proportional, integral) processing, and sends out a signal corresponding to the operating value $MV_1$ to the adder 21 as an operation signal for feedback control. The adder 21 executes calculation for adding $MV_1$ to the above-described operating value $MV_0$ to determine an operating value $MV_2$, and a signal corresponding to the operating value $MV_2$ is added to function generators 27 and 29.

Now, the operating value $MV_0$ for feedforward control is explained. The operating value $MV_2$ obtained by the adder 21 can be almost approximated to the operating value $MV_0$ for a feedforward control during the steady-state operation of the compressor 1. The necessary openings of the IGV 5 and RCV 7 corresponding to the load of the gas turbine 15 can be predicted from the relationship shown in FIG. 2. The signal representative of the above-described operating value $MV_0$, which specifies the predicted necessary openings of the IGV 5 and RCV 7, is sent out to both of the function generators 27 and 29.

Figure 4:
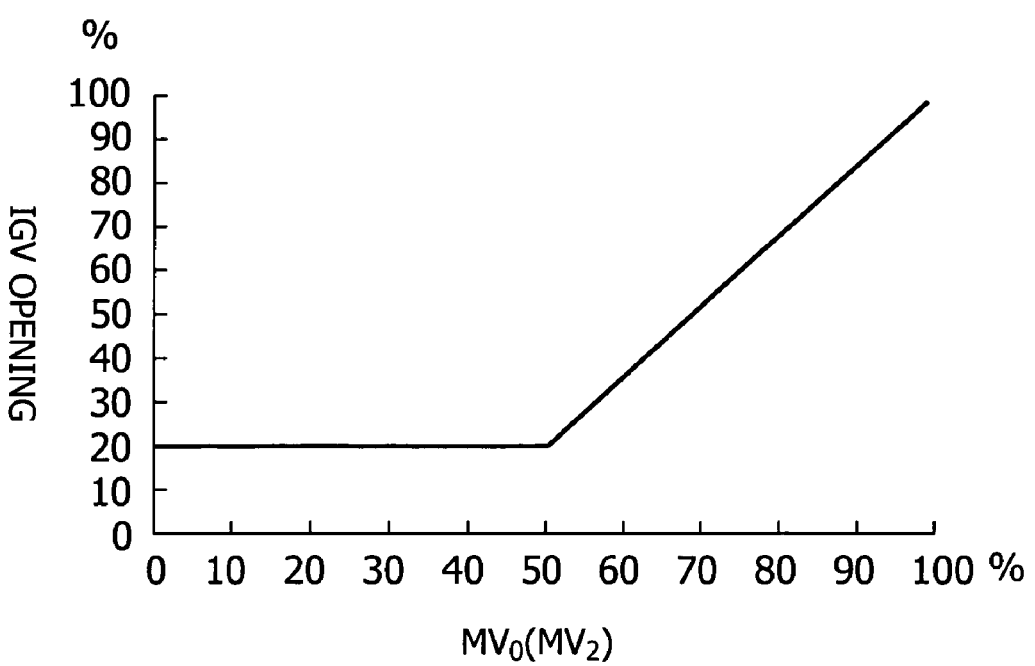
FIG. 4 is a graph illustrating a function of a valve opening operating value specifying an IGV opening.

The function generator 27 forms a valve control signal in which, for example, the IGV opening is held to 20% (corresponding to the above-described minimum opening) until the operating value $MV_0$ reaches 50% based on the function illustrated in FIG. 4, and the IGV opening is increased linearly from 20% up to 100% as the operating value $MV_0$ increases from 50%, and sends out this valve control signal to the IGV 5.

On the other hand, the function generator 29 sets an operating value $MV_3$ which, for example, linearly decreases the RCV opening from 100% down to 0% until the operating value $MV_0$ increases to 50%, and holds the RCV opening to 0% when the operating value $MV_0$ is 50% and more, and sends out a signal corresponding to this operating value $MV_3$ to a high-level selection section 31.

Next, a function generator 33 is explained.

FIG. 2 shows a surge line d for the compressor 1 and a surge control line e which is set with a margin for antisurging being secured. Both of the surge line d and the surge control line e are functions of the opening of the IGV 5.

The function generator 33 calculates a discharge flow rate set value $SV_2$ for antisurging based on a function representative of the surge control line e and the opening information of the IGV 5 sent from the function generator 27, and sends out a signal corresponding to the set value $SV_2$ to a flow controller 35. The flow controller 35 calculates an operating value $MV_4$ corresponding to a deviation between the set flow rate $SV_2$ and an actual discharge flow rate $PV_2$ detected by a flowmeter 37, and sends out a signal corresponding to the operating value $MV_4$ to the high-level selection section 31.

The high-level selection section 31 compares the signal representative of the operating value $MV_4$ sent out from the function generator 33 with the signal representative of the operating value $MV_3$ sent out from the function generator 29, and sends out either signal which is larger one of these two signals to the RCV 7 as a valve control signal.

Hereunder, the operation of the control unit for a fuel gas compressor in accordance with the first embodiment is explained.

For example, in the case where the set pressure $SV_1$ is $P_1$ and an output command for requiring the discharge flow rate $F_1$ shown in FIG. 2 is issued from the load command section 17, the opening of the IGV 5 is set at 50% by the output of the function generator 27 on the basis of the operating value $MV_2$ ($MV_0$), and also the opening of the RCV 7 is set at 0% by the output of the function generator 29 on the basis of the operating value $MV_2$ ($MV_0$). The opening setting of the IGV 5 and the RCV 7 is executed by feedforward control, so that the discharge pressure of the compressor 1 is brought close to the set value $P_1$ quickly. Finally, the discharge pressure is set at the set value $P_1$ with high accuracy by the feedback control on the basis of the operating value $MV_2$ ($MV_1$). As a result, the operation point of the compressor 1 comes to the point $A_1$ shown in FIG. 2.

Next, for example, when an output command for requiring the discharge flow rate $F_2$ shown in FIG. 2 is issued from the load command section 17, in this case, the opening of the IGV 5 is set at 20%, which is the above-described minimum value, and the opening of the RCV 7 is set so that the fuel gas of a flow rate of $F_3-F_2$ is recycled to the fuel feed line 3 side. That is to say, the RCV 7 is opened, and thereby excess fuel passing through the IGV 5 is returned to the fuel feed line 3 side via the RCV 7. As a result, the discharge flow rate of the compressor 1 becomes substantially to $F_3$.

In this case as well, the discharge pressure of the compressor 1 is brought close to the target value $P_1$ quickly by the opening setting of the IGV 5 and the RCV 7 due to feedforward control, and the discharge pressure is set at the target value $P_1$ with high accuracy by feedback control. As a result, the operation point of the compressor 1 comes to point $A_3$.

Next, a case where a load shutdown signal or a signal telling that the compressor 1 or the gas turbine has tripped is sent out to the load command section 17 is explained. Here, it is assumed that the set pressure $SV_1$ is $P_2$ shown in FIG. 2.

At the load shutdown time or at the trip time of compressor 1 etc., for example, an output command for requesting a discharge flow rate $F_4$ (the minimum flow rate capable of maintaining fuel combustion in the gas turbine 15) shown in FIG. 2 is sent out from the load command section 17.

In this case, if the opening of the IGV 5 is set at 20%, which is the above-described minimum opening, the compressor 1 is operated in a surge region exceeding the surge line d. In this embodiment, however, since the signal representative of the operating value $MV_4$ for antisurge control is sent out from the flow controller 35 as described above, the surge operation of the compressor 1 is avoided.

That is to say, if the discharge flow rate decreases to the surge region, the operating value $MV_4$ becomes larger than the operating value $MV_3$ sent out from the function generator 29, so that the high-level selection section 31 selects the signal corresponding to the operating value $MV_4$ as a valve control signal for the RCV 7. As a result, the operation on the surge control line e is executed. At this time, since the discharge pressure is controlled by the IGV 5 so as to take the target value $P_2$, the final operation point of the compressor 1 comes to $A_5$. By this setting of operation point, the compressor 1 is operated in a state in which surging is avoided. At the operation point $A_5$, the opening of the IGV 5 is larger than the minimum opening (20%), and the fuel gas of a flow rate of $F_5-F_4$ is recycled via the RCV 7.

As described above, according to the control unit for a compressor in accordance with the first embodiment, since not only the IGV 5 but also the RCV 7 is utilized for the control of discharge pressure, variations in discharge pressure of the compressor 1 can be restrained, namely, the controllability of discharge pressure can be improved under all operating conditions (at the load shutdown time, at the trip time of the compressor 1 and the gas turbine 15, at the time of normal operation, etc.)

Moreover, when the operating value $MV_2$ is 50% or more, the command signal for the discharge pressure of the RCV 7 is zero and the discharge pressure is controlled by the IGV 5 only, and when the operating value $MV_2$ is less than 50%, the IGV 5 is kept at the minimum opening (20%) and the discharge pressure is controlled by the RCV 7 only; namely, the IGV 5 and the RCV 7 are operated in the split range. Therefore, the interference of discharge pressure control caused by the IGV 5 and the RCV 7 is avoided.

Also, since the discharge pressure is controlled by a combination of feedforward control and feedback control, pressure control with high readiness can be carried out. Therefore, even in the case where a sudden load is requested for the gas turbine 15, variations in discharge pressure can be restrained.

Furthermore, since higher-level control of discharge pressure control and antisurge control is selectively applied to the RCV 7, the interference between these controls is also avoided.

In the case where the inlet pressure of the compressor 1 varies, by changing the minimum opening of the IGV 5 so as to correspond to the inlet pressure, the pressure control can be carried out with higher accuracy.

Figure 5:
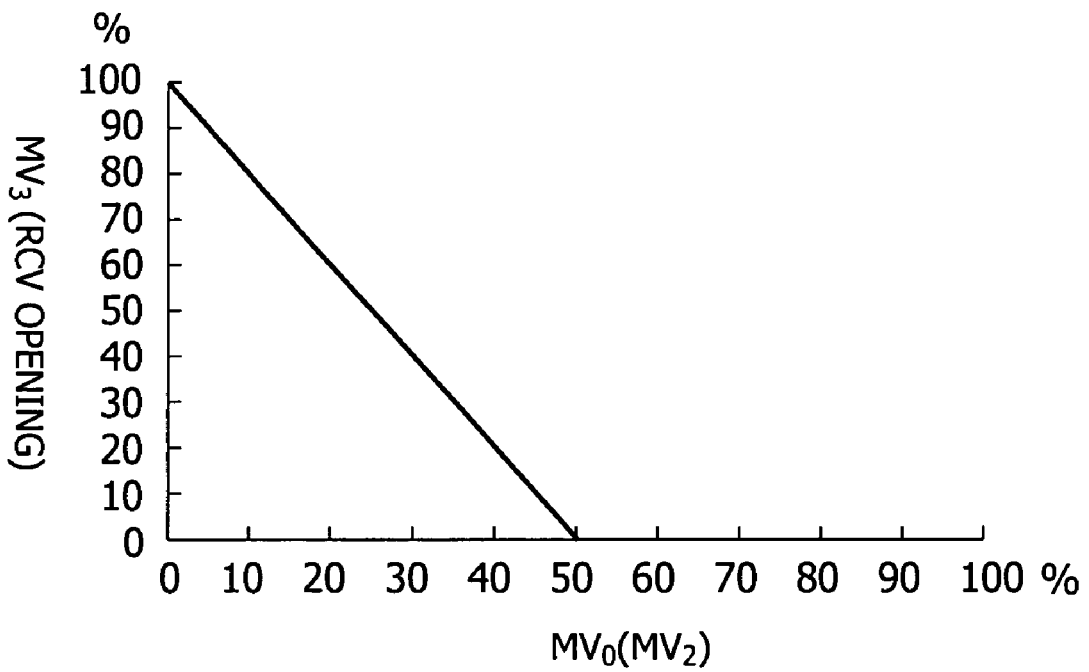
FIG. 5 is a graph illustrating a function of a valve opening operating value specifying an RCV opening.

Also, in the above-described embodiment, the split points of the IGV 5 and the RCV 7 are set at 50% as shown in FIGS. 4 and 5. However, the split points are not limited to 50%. That is to say, the inclinations of functions shown in FIGS. 4 and 5 specify the control gains of the IGV 5 and the RCV 7, respectively, so that the split points may be changed to change these gains.

For example, if the split points are made larger than 50%, the operation time of the IGV 5 with poor response can be shortened, and also the operation stability of the RCV 7 with high response can be improved. In effect, taking account of the dynamic characteristics etc. of the IGV 5 and the RCV 7, the split points can be set appropriately so that the controllability of these valves is improved.

Embodiment 2

Figure 6:
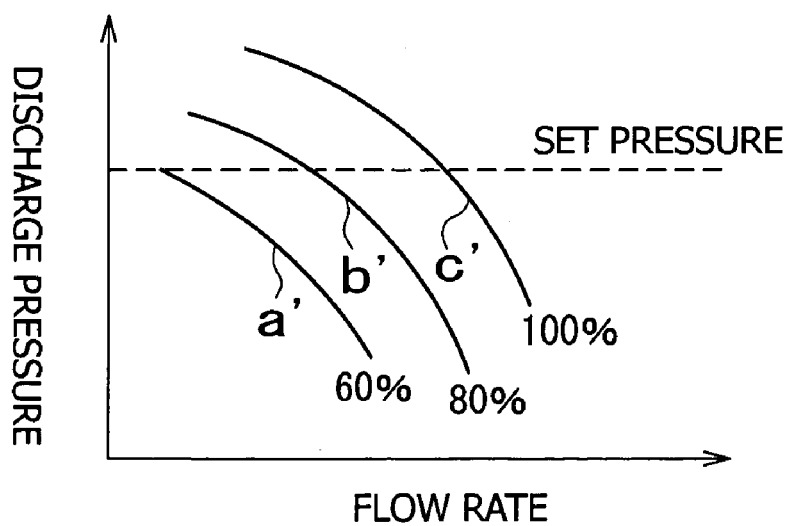
FIG. 6 is a characteristic diagram illustrating the relationship between discharge flow rate and discharge pressure with the number of revolutions of compressor being a parameter.

Curves a', b' and c' in FIG. 6 illustrate the relationship between discharge flow rate and discharge pressure of the compressor 1 in the case where the number of revolutions of the compressor 1 is set at 60%, 80% and 100%, respectively. As is apparent from comparison of FIG. 6 with FIG. 2, even if the rotational speed of the compressor 1 is operated in place of the opening operation of the IGV 5, the discharge pressure can be controlled.

Figure 7:
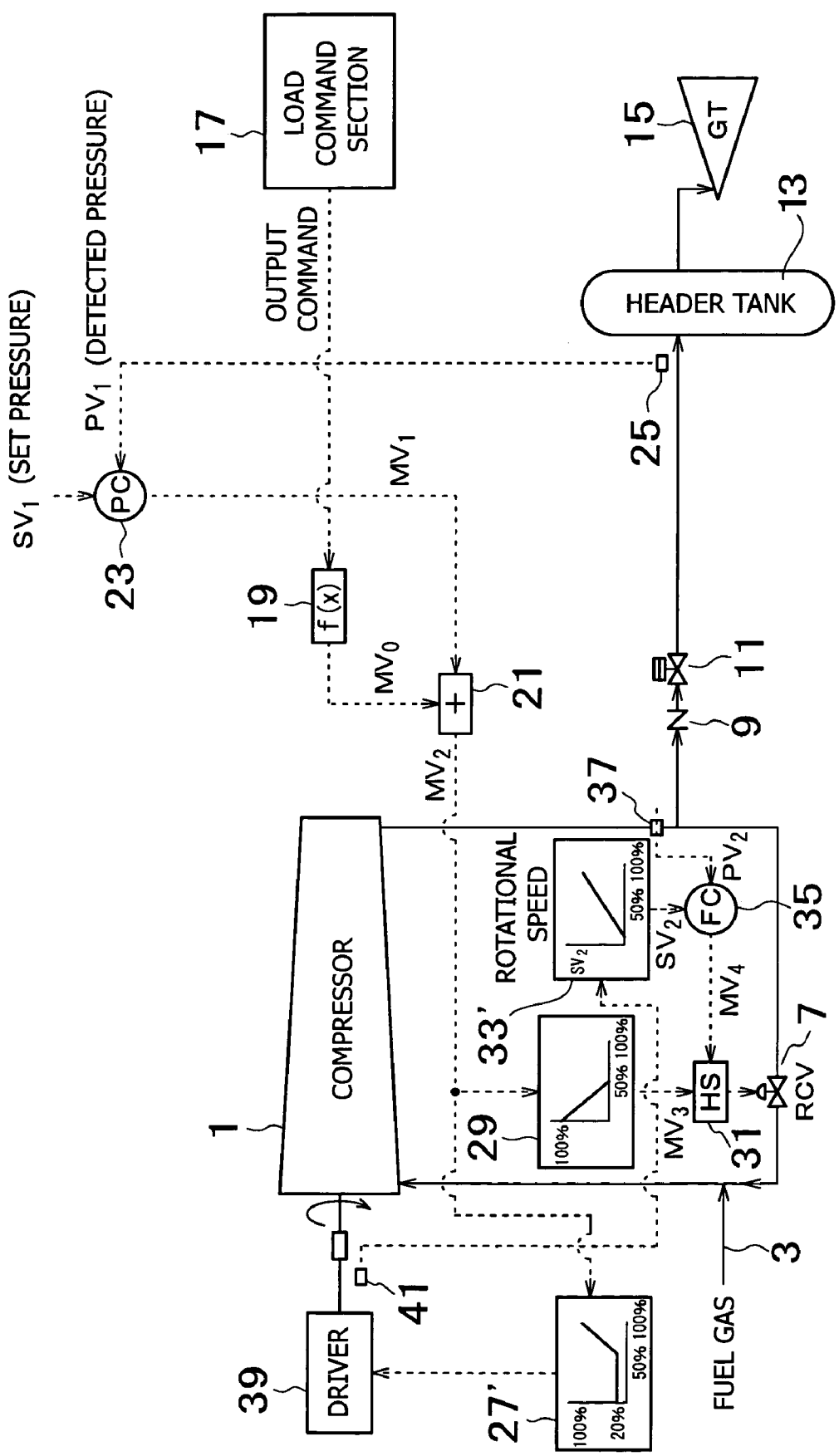
FIG. 7 is a block diagram showing a second embodiment of a control unit for a compressor in accordance with the present invention.

FIG. 7 shows a second embodiment of the present invention configured so that the discharge pressure is controlled by the speed operation of the compressor 1. This second embodiment differs from the above-described first embodiment in that the IGV is eliminated, in that a function generator 27' corresponding to the function generator 27 shown in FIG. 2 is provided so that the rotational speed of a driver 39 such as a steam turbine for rotationally driving the compressor 1 is controlled by the output of the function generator 27', and in that a rotational speed detector 41 for detecting the rotational speed of the compressor 1 is provided so that the output of this rotational speed detector 41 is added to a function generator 33' corresponding to the function generator 33 shown in FIG. 2.

In this second embodiment as well, the same effects as those of the above-described first embodiment can be obtained. In the second embodiment, the actual rotational speed of the compressor 1 detected by the rotational speed detector 41 is sent to the function generator 33'. In place of this, the rotational speed commanded by the function generator 27' may also be sent to the function generator 33'.

Embodiment 3

Figure 8:
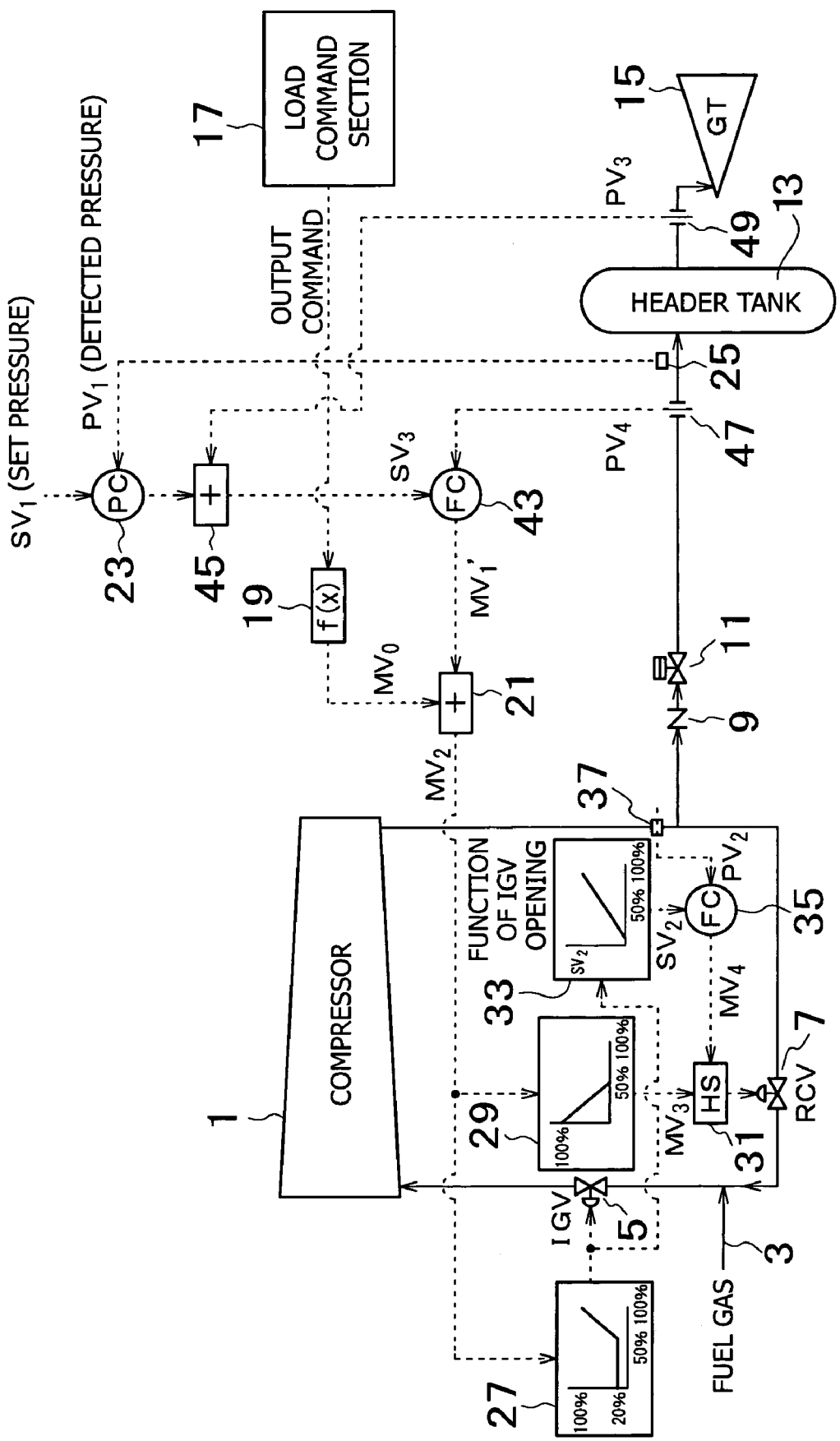
FIG. 8 is a block diagram showing a third embodiment of a control unit for a compressor in accordance with the present invention.

FIG. 8 shows a third embodiment of the present invention. This third embodiment differs from the above-described first embodiment in that a flow controller 43 and an adder 45 are interposed between the adder 21 and the pressure controller 23, and in that flowmeters 47 and 49 for detecting the inlet flow rate and outlet flow rate of the header tank 13, respectively, are provided so that the outputs of the flowmeters 47 and 49 are added to the flow controller 43 and the adder 45, respectively.

In the third embodiment, the adder 45 adds a signal (feedforward signal) representative of the outlet flow rate of the header tank 13, namely; a signal illustrating the fuel feed rate required by the turbine 15, to the signal (feedback signal) corresponding to the deviation of the discharge pressures, and sends the addition result to the flow controller 43 as a set flow rate $SV_3$. The flow controller 43 calculates a deviation between the set flow rate $SV_3$ and the inlet flow rate (actual discharge flow rate) of the header tank 13, and forms a flow rate operating value $MV_1'$ by subjecting this deviation to PI processing.

According to this third embodiment, in addition to the feedback control that eliminates the deviation of the discharge pressures, control that eliminates a deviation between in and out flow rate of fuel gas with respect to the header tank 13 is executed. Therefore, the pressure of fuel gas supplied to the gas turbine 15 is further stabilized.

In the control unit of the third embodiment as well, the configuration shown in FIG. 7, in which the rotational speed of the compressor 1 is operated to control the discharge pressure, can be applied. Also, in the first to third embodiments, the fuel gas pressure at the inlet of the header tank 13 is detected by the pressure gage 25. However, the configuration may be such that the pressure gage 25 detects the fuel gas pressure in the header tank 13.

Embodiment 4

Next, a fourth embodiment of the present invention is explained with reference to FIG. 9. The control unit in accordance with the fourth embodiment controls the discharge pressures of two compressors 1A and 1B.

Figure 9:
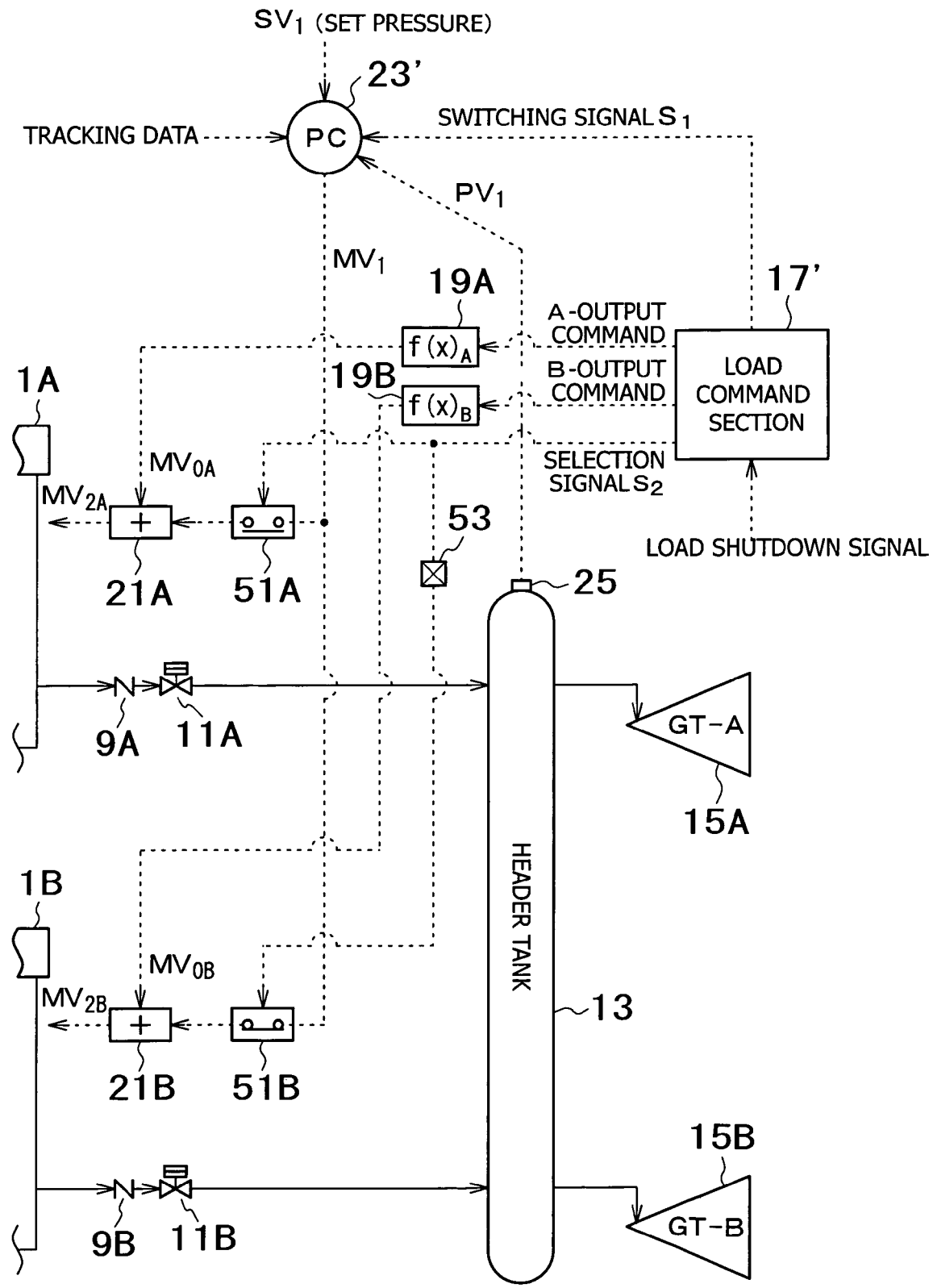
FIG. 9 is a block diagram showing a fourth embodiment of a control unit for a compressor in accordance with the present invention.

In FIG. 9, the common or corresponding reference numerals are applied to elements having a construction and function equivalent to those of the elements shown in FIG. 1. Also, on the compressor 1A, 1B side in FIG. 9, elements corresponding to the elements shown in FIG. 1, such as the IGV 5, RCV 7, function generators 27, 29 and 33, high-level selection section 31, and flow controller 35 are provided. In FIG. 9, these elements are omitted.

In this embodiment, switching elements 51A and 51B are provided between a pressure controller 23' and an adder 21A and between the pressure controller 23' and an adder 21A, respectively. Also, the pressure gage 25 detects the pressure of fuel gas in the header tank 13.

At the time of normal operation, a selection signal $S_2$ of logic level [H] is sent out from a load command section 17'. Since the switching elements 51A and 51B are configured so as to be opened by the signal of logic level [H], as shown in FIG. 9, the switching element 51A that directly receives the selection signal $S_1$ is opened, and the switching element 51B that receives the signal $S_2$ via an inverter 53 is closed.

In this state, an operating value $MV_{2A}$ for controlling the IGV and RCV (not shown) relating to the compressor 1A is expressed as $MV_{2A}=MV_{0A}$, and an operating value $MV_{2B}$ for controlling the IGV and RCV (not shown) relating to the compressor 1B is expressed as $MV_{2B}=MV_1+MV_{0B}$. That is to say, only feedforward control is executed for the IGV and RCV relating to the compressor 1A, and both feedforward control and feedback control are executed for the IGV and RCV relating to the compressor 1B.

In this case, both of the compressors 1A and 1B are given, for example, the operation point $A_1$ shown in FIG. 2 by feedforward control. An error of discharge pressure produced by mistaken estimation of function of feedforward control is absorbed by feedback control on the compressor 1B side. As a result, the compressor 1A is operated at the operation point $A_1$, and the compressor 1B is operated at a point shifting from the operation point $A_1$ by error correction amount.

Here, a case where the compressor 1B or a turbine 15B trips is explained. In this case, the load command section 17' sends out a selection signal $S_2$ of logic level [L] based on a trip generation signal from a high-level control unit, not shown. As a result, the switching element 51A is closed, and the switching element 51A is opened. Thereby, pressure feedback control is transferred from a control system on the compressor B side to a control system on the compressor A side. Therefore, the pressure of fuel gas in the header tank 13 is controlled so as to maintain a value before the compressor 1B trips.

As described above, in this embodiment, pressure feedback control is executed only by either one of the control system on the compressor A side and the control system on the compressor B side. The reason for this is that in the case where pressure feedback control is executed by both of the control systems, these controls may interfere with each other.

On the other hand, in the case where a load shutdown signal is sent to the load command section 17 by a high-level control unit, the load command section 17 sends out an operating value switching signal $S_1$ to the pressure controller 23'. Therefore, the pressure controller 23' sends out tracking data, which changes the operating value $MV_2$ to a size such that the RCV 7 is suddenly opened, as the operating value $MV_1$. As a result, the RCV 7 is operated so as to be opened suddenly with high response, and variations in pressure at the load shutdown time are further restrained. Such a tracking operation can also be applied to the first to third embodiments.

The invention claimed is:

1. A control unit for a compressor, comprising:
an inflow quantity regulating means for regulating the inflow quantity of a fuel gas to a compressor;
a recycle valve for returning the fuel gas discharged from the compressor to the inlet side of the compressor; and
a control means which sets a control operating value for operating the compressor at a predetermined operation point, and controls the inflow quantity regulating means and the recycle valve based on the control operating value, characterized in that
the control means has a first control signal generating means which generates a signal increasing with an increase in the operating value as a control signal for the inflow quantity regulating means when the control operating value is a predetermined value or larger and a second control signal generating means which generates a signal decreasing with an increase in the operating value as a control signal for the recycle valve when the control operating value is smaller than the predetermined value.

2. The control unit for a compressor according to claim 1, characterized in that the inflow quantity regulating means is an inlet guide valve provided at the inlet of the compressor.

3. The control unit for a compressor according to claim 1, characterized in that the inflow quantity regulating means is a driver for rotating the compressor.

4. The control unit for a compressor according to claim 1, characterized in that the first control signal generating means is configured so as to generate a minimum opening signal for making the opening of the inlet guide valve a predetermined minimum opening when the control operating value is smaller than the predetermined value.

5. The control unit for a compressor according to claim 4, characterized in that the value of the minimum opening signal is changed according to the pressure of fuel gas flowing into the compressor.

6. The control unit for a compressor according to claim 5, characterized in that in the case where the fuel gas discharged from the compressor is supplied to load equipment via a header tank, the operating value for feedback control is set based on a deviation between a discharge flow rate set value corresponding to the deviation in pressure of the fuel gas and the inflow quantity of fuel gas to the header tank.

7. The control unit for a compressor according to claim 6, characterized in that the discharge flow rate set value corresponding to the deviation in pressure of the fuel gas includes the outflow quantity of the fuel gas from the header tank.

8. The control unit for a compressor according to claim 7, characterized in that the valve control means is configured so that at the load shutdown time, tracking of the operating value for feedback control to a predetermined value is performed to quickly open the recycle valve.

9. The control unit for a compressor according to claim 6, characterized in that the valve control means is configured so that at the load shutdown time, tracking of the operating value for feedback control to a predetermined value is performed to quickly open the recycle valve.

10. The control unit for a compressor according to claim 1, characterized in that the control operating value is a value obtained by adding an operating value for feedforward control to an operating value for feedback control.

11. The control unit for a compressor according to claim 10, characterized in that the operating value for feedback control is formed based on a deviation in pressure of fuel gas discharged from the compressor, and the operating value for feedforward control is formed based on the magnitude of load of the compressor.

12. The control unit for a compressor according to claim 11, characterized in that the valve control means is configured so that at the load shutdown time, tracking of the operating value for feedback control to a predetermined value is performed to quickly open the recycle valve.

13. The control unit for a compressor according to claim 10, characterized in that the valve control means is configured so that at the load shutdown time, tracking of the operating value for feedback control to a predetermined value is performed to quickly open the recycle valve.

14. The control unit for a compressor according to claim 1, characterized in that the valve control means further includes an antisurge signal generating means; and a high-level selecting means which compares an antisurge signal with the control signal of the recycle valve, and selectively sends out a higher-level signal of these signals to the recycle valve.

15. The control unit for a compressor according to claim 1, characterized in that in the case where a plurality of compressors are operated at the same time, a value obtained by adding an operating value for feedforward control to an operating value for feedback control is used as the control operating value for any one compressor, and the operating value for feedforward control is used as the control operating value for other compressors.

* * * * *